March 16, 1954

R. H. LAMB 2,672,491

ELECTRIC ARC FURNACE AND COVER WITH
ELECTRODES AND FEED CONDUITS

Filed July 3, 1951

INVENTOR
ROBERT H. LAMB
BY
ATTORNEY

March 16, 1954  R. H. LAMB  2,672,491
ELECTRIC ARC FURNACE AND COVER WITH
ELECTRODES AND FEED CONDUITS Filed July 3, 1951  10 Sheets-Sheet 2

FIG. 2

INVENTOR
ROBERT H. LAMB
BY
ATTORNEY

March 16, 1954  R. H. LAMB  2,672,491
ELECTRIC ARC FURNACE AND COVER WITH
ELECTRODES AND FEED CONDUITS
Filed July 3, 1951                           10 Sheets-Sheet 5

FIG. 5

INVENTOR
ROBERT H. LAMB
BY
ATTORNEY

FIG. 6

INVENTOR
ROBERT H. LAMB
BY
ATTORNEY

R. H. LAMB 2,672,491

ELECTRIC ARC FURNACE AND COVER WITH
ELECTRODES AND FEED CONDUITS

Filed July 3, 1951

INVENTOR
ROBERT H. LAMB
BY
ATTORNEY

March 16, 1954

R. H. LAMB 2,672,491

ELECTRIC ARC FURNACE AND COVER WITH
ELECTRODES AND FEED CONDUITS

Filed July 3, 1951

INVENTOR
ROBERT H. LAMB
BY
*H. Hume Mathews*
ATTORNEY

INVENTOR
ROBERT H. LAMB
BY
ATTORNEY

Patented Mar. 16, 1954

2,672,491

UNITED STATES PATENT OFFICE 2,672,491

ELECTRIC ARC FURNACE AND COVER WITH ELECTRODES AND FEED CONDUITS

Robert H. Lamb, Darien, Conn., assignor to Air Reduction Company, Incorporated, a corporation of New York Application July 3, 1951, Serial No. 234,933

10 Claims. (Cl. 13—9)

This invention relates to electric arc furnaces.

The primary object of my invention is to provide improvements in electric arc furnaces of the type particularly adapted for the production of a carbide, such as calcium carbide.

Another object of my invention is to provide a calcium carbide furnace which is advantageous for large-scale continuous operations.

Another object is to provide an improved furnace cover for more effectively using the sensible heat of reaction gases to preheat the charge of raw material by superimposing more raw material above the reaction zone and forcing reaction gases countercurrently therethrough.

Another object is to provide a furnace cover means wherein a slight positive pressure is uniformly maintained in the upper parts of the furnace and in the feeding arrangement, and yet gas leakage through the electrode seal is minimized.

Another object is to provide a cover construction which will provide the various types of necessary insulation, will resist destructive slagging, and will have the necessary structural strength.

In the prior art it was appreciated that open-top electric arc furnaces operate quite efficiently shortly after starting up. The gases evolved in the reaction zones around the electrodes spread in the porous charge, and rise easily to the top and top sides of the furnace through the charge. In this way, some of the charge becomes preheated, and the moisture is driven out. However, after the furnace has been in operation for some time and fresh charges have been added, part of the charge will have sintered around the electrodes, often causing craters or crucibles to form around the electrodes. As the crater wall has a tendency to increase in thickness, the craters usually become steadily smaller and tend to become so contracted near their tops that they form narrow channels around the electrodes above the electrode tips. The furnace gases cannot easily penetrate the crater walls; and accordingly, a large proportion of the gases is forced out of the craters at high velocities along the surface of the electrodes through the channels, which are the paths of least resistance. This undesirable phenomenon is known as channeling. Because of this channeling, the sensible heat of the reaction gases does not effectively preheat the raw material charge and the gases entrain the small particles of the charge which is fed to the reaction zone. The lack of preheating by the reaction gases and the loss of material due to entrainment tend to cause inefficient furnace operation.

The extent, even during initial operation, to which the furnace charge may be preheated by the product gases is determined, largely, by the penetration of the electrodes into the charge material. The gases are evolved in a reaction zone at the tip of each electrode beneath the surface of the charge, and then they pass upwardly through the covering layer of raw material. During such passage, the upper strata of charge material absorbs heat from the product gases. It is, therefore, desirable to provide a sufficient depth of material above the reaction zone to absorb substantially all of the available heat from the gases. There have not been available, heretofore, satisfactory commercial constructions which provide a layer of this depth; and in prior constructions only a portion of the available heat of the product gases has been utilized.

In the operation of the commercial type of electric carbide furnace the majority of electric current flows between the lower ends of the electrodes and the furnace hearth electrode, which is made of some electrically conductive material. Electrical resistance of the charge in the space between the electrodes and the hearth electrode produces the heat effect required for the process. This resistance may be varied by changing the electrode to hearth spacing. Ordinarily the furnace is electrically controlled by fixing the voltage, which is fixed as high as possible for economy reasons, and varying the electrode to hearth spacing to permit a predetermined flow of current. This is done by a hoist or elevating mechanism actuated by a current metering instrument which raises or lowers the electrodes as circumstance demands. When too much current flow occurs, the electrodes are raised to the point necessary to re-establish the desired current and when too little current flows the electrodes are lowered. It would appear from this that the position of the electrode is established with respect to the furnace hearth and is independent of the level of charge material in the furnace. Any desired electrode penetration could then, of course, be obtained by simply adding more material.

However, this is not the case. In practice, leakage electric current passes laterally between the electrodes through the material above the reaction zones. This leakage current, or short circuiting, has an exaggerated influence on the positioning of the electrodes. So much so, in fact, that only a limited depth of such material may be placed above the reaction zone before the electrode will reposition itself again with respect to the surface of the material. The problem is particularly acute in carbide furnaces, since the charge material in these furnaces has a high conductivity.

Another factor accentuates the possibility of leakage current. If the electrodes of a multi-electrode carbide furnace are spaced too far apart, three separate pools of molten carbide, one beneath each electrode, are formed and must be tapped from the furnace through three separate tap holes. If the electrodes are brought closer together, a point will be reached where the pools will join and may be tapped through a single hole. Single hole tapping is highly desirable, so an attempt is made to so space the electrodes that the molten pools join. In a carbide furnace this requires that the electrodes be rather close together, and the close spacing together with the relatively high electrical conductivity of the charge, leads to considerable leakage of electricity between electrodes above the reaction zone. As pointed out above, this lateral short circuiting plays an unproportionate part in determining the elevation of the tip of the electrode. It is therefore desirable, in multi-electrode carbide furnaces, to provide a cover construction which will prevent lateral short circuiting and at the same time provide for highly efficient direct heat exchange between furnace off gases and incoming furnace charge material.

It is also desirable that the raw material be fed directly downward around the electrode since then the reaction gases which are channelized around the electrode will have their velocities reduced and will be dispersed or distributed by the superimposed raw material which is located in the path of least resistance for the escaping reaction gases.

Also the high temperature of the escaping gases, the eruptions in the reaction zone, and the occasional exposure to radiant heat from the arc impose severe thermal conditions on any carbide furnace cover so that it is desirable to provide a cover fabrication which will effectively withstand these thermal conditions.

The above considerations have particular reference to the stationary electric arc furnaces, but in general they also apply to the electric arc furnaces having a rotating hearth such as disclosed in the T. Ellefsen patent, No. 2,300,355, issued October 27, 1942.

The two embodiments of my invention, herein disclosed, provide for the aforementioned desirable features by means of a novel and improved furnace cover which is applicable to either the stationary furnace or the rotary furnace. The cover includes separate pre-heating closed feed chambers in which quantities of raw material are disposed above the reaction zone in the path of escaping reaction gases. These feed chambers extend up from a refractory base portion which extends completely over and seals the top of the furnace. Each chamber has feed entrances and a single gas outlet all adjacent an electrode seal at the top of the chamber, so that direct heat exchange occurs between the incoming raw material and the outgoing reaction gases. The refractory concrete cover is structurally reinforced and has cooling means incorporated therein.

Objects and advantages other than those above set forth will be apparent from the following description of two presently preferred embodiments of the invention, when read in connection with the accompanying drawings thereof.

In the drawings, which disclose a stationary furnace (Figs. 1-4) and a rotary furnace (Figs. 5-12).

The cover structures of the two embodiments of the invention are similarly constructed, the principal difference being that one is provided with a seal which is adapted to cooperate with a rotary hearth. The essential structure and its advantages relative to refractory construction, efficient preheating of raw material (while preventing lateral current leakage), and uniform pressurizing are the same. In general, the following description of the stationary furnace cover is equally applicable to the rotary furnace cover and vice versa. Further minor differences in the two covers are in the electrode seal, in the cooling means, and in the cover-supporting means.

Figure 1:
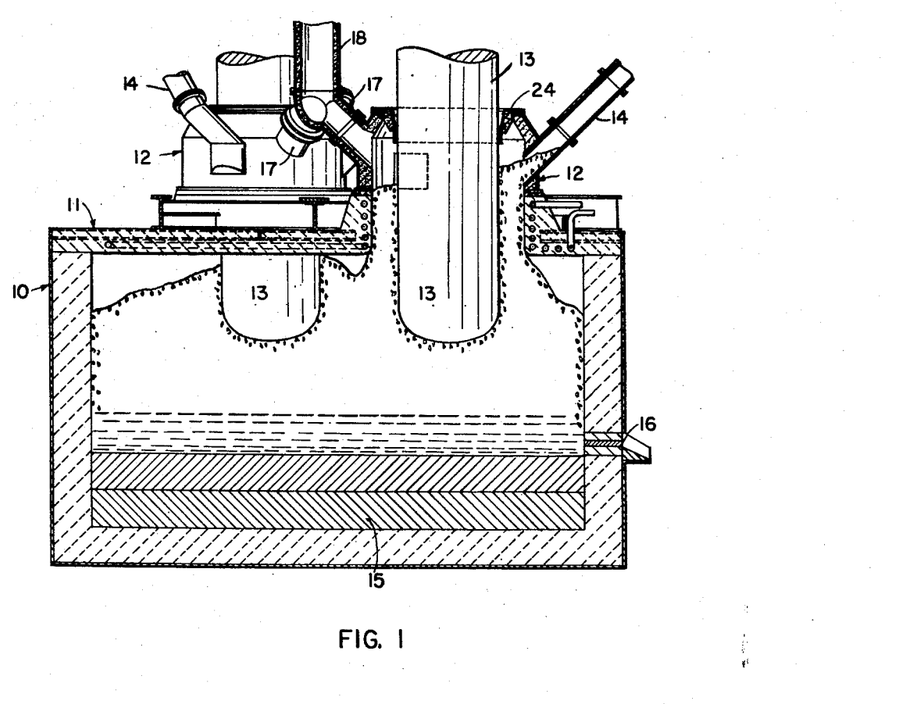
Fig. 1 is a cross-sectional side view of the furnace along line 1—1 of Fig. 2, and shows a feed chamber of the cover with an electrode extending therethrough into the furnace and the gas outlet and a feed chute for the chamber.

The preferred embodiment of the invention, as applied to a stationary furnace, is clearly shown in Fig. 1. The principal parts of the furnace installation of Fig. 1 are the cylindrical brick-lined furnace 10, the furnace cover 11 having three pre-heating feed chambers or domes 12 (two appearing in the figure) which are arranged at the points of an equilateral triangle, and the cylindrical electrodes 13 extending downwardly through the top of the domes 12, coaxially therewith. Raw material, such as calcium oxide and coke, is fed to the furnace in regulated amounts through a plurality of gravity-feeding chutes 14 which terminate near the top of domes 12. The raw material feeds down through the space between the electrodes 13 and dome walls into the reaction zones at the tips of the electrodes 13. Heat for the reaction of the raw materials is supplied by electric arcs which exist in operation in the space between the electrode tips and the hearth electrode 15 in the bottom of the furnace 10. The end product, such as calcium carbide, is removed by means of a tap hole 16 in the side wall of the furnace 10. The gases, which are generated in the reaction zone, will rise up through the incoming raw material in the domes 12 and pass into gas offtakes 17 at the top portion of the domes 12. The arrangement of the gas offtakes 17 can be seen by referring to Fig. 2.

Figure 2:
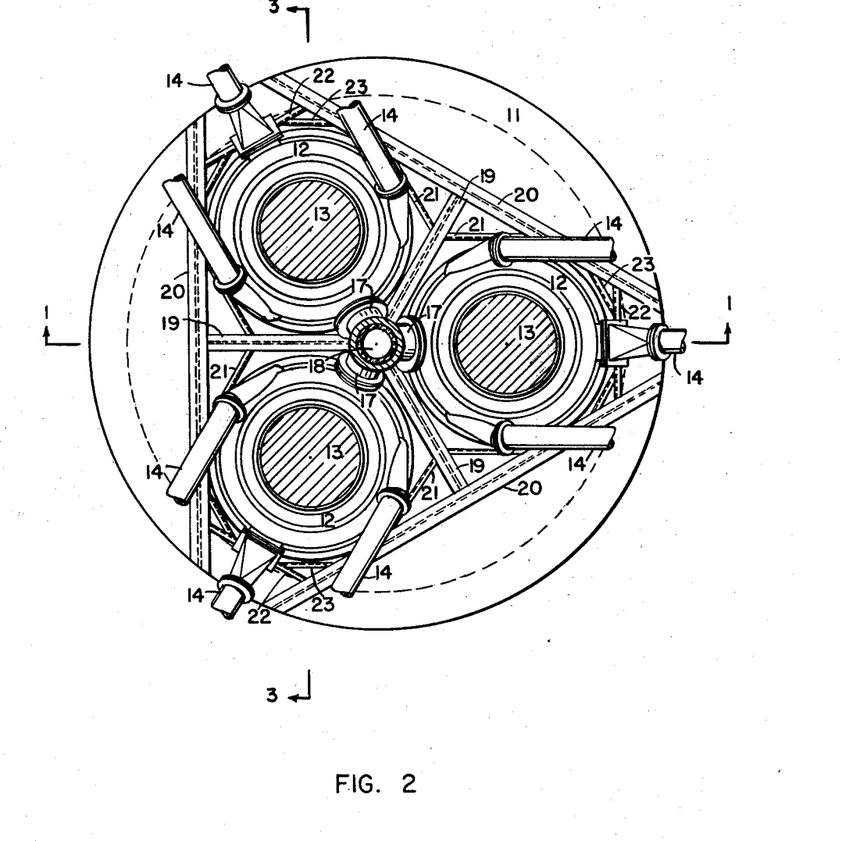
Fig. 2 is a top view of the furnace with electrodes in cross-section and shows the feed chutes, the gas outlet, and parts of the cover-supporting structure.

In Fig. 2 the gas outlets 17 from the domes 12 are shown compactly merging into the centrally located common header 18. The structural support for the refractory cover also appears and has steel structural elements 19 which radiate from the center of the furnace cover 11, join tangent supports 20, and are braced thereto by corner supports 21. The adjacent ends of tangent supports 20 are connected by means of beams 22 which are braced by members 23. As clearly shown, electrodes 13 are at the center of domes 12 which are arranged in equilateral triangular pattern. All metallic structural elements may be made of a non-magnetic, stainless steel in order to avoid magnetically induced electric currents. Elements near the center of the furnace, preferably, are non-magnetic; if magnetic steel is used, the steel structural members or supports are preferably cooled in order to prevent structural failure due to the heating of the members and supports by induced electrical currents.

Figure 3:
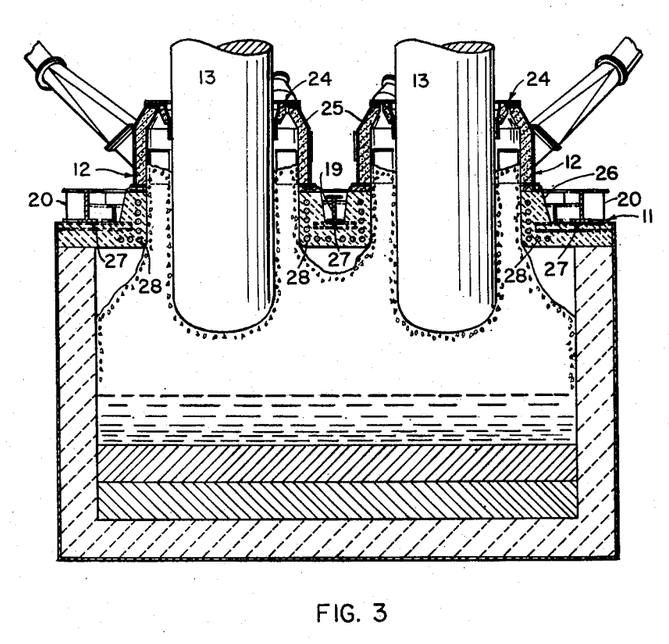
Fig. 3 is a cross-sectional side view along line 3—3 of Fig. 1, and shows two feed chambers of the furnace cover.

A vertical cross section of the structurally-reinforced, monolithic refractory cover appears in Fig. 3. Electrode seal 24 at the top of the dome 12 surrounds the electrodes 13 and prevents the escape of reaction gases. The dome 12 comprises an upper part, or cap, 25 and a lower part 26. The refractory lower part 26 is a boss-like structure extending up from, and integral with, the flat main portion of the cover 11. Steel members 27 depend from the cover structural supports 19 and 20 and are embedded in the main portion of cover 11. Water cooling coils 28, which are embedded in lower part 26 of dome 12 and in the flat portion of the cover, are used in the preferred embodiment since unusual operating conditions occasionally exist which would cause slagging of the interior surfaces of the refractory cover. The cooling of the cover 11 by coils 28 gives the cover a longer life and less maintenance is required.

The monolithic cover is preferably made of a suitable refractory concrete such as calcium aluminate cement with crushed fire brick aggregate because it is non-magnetic and a poor conductor of electricity. Further, a refractory concrete is not injured by reasonably high temperatures and is a good heat insulator. Since the cover is not self-supporting, the flat steel framework 19 to 23, described above, is provided. Steel members 27 are appropriately spaced and embedded in the refractory and connected to the flat framework in order to give structural strength to the refractory cover. Thus, a monolithic, refractory concrete cover is provided which gives electrical and thermal insulation and is strengthened by a non-magnetic support and protected against unusually severe furnace conditions by cooling means.

Figure 4:
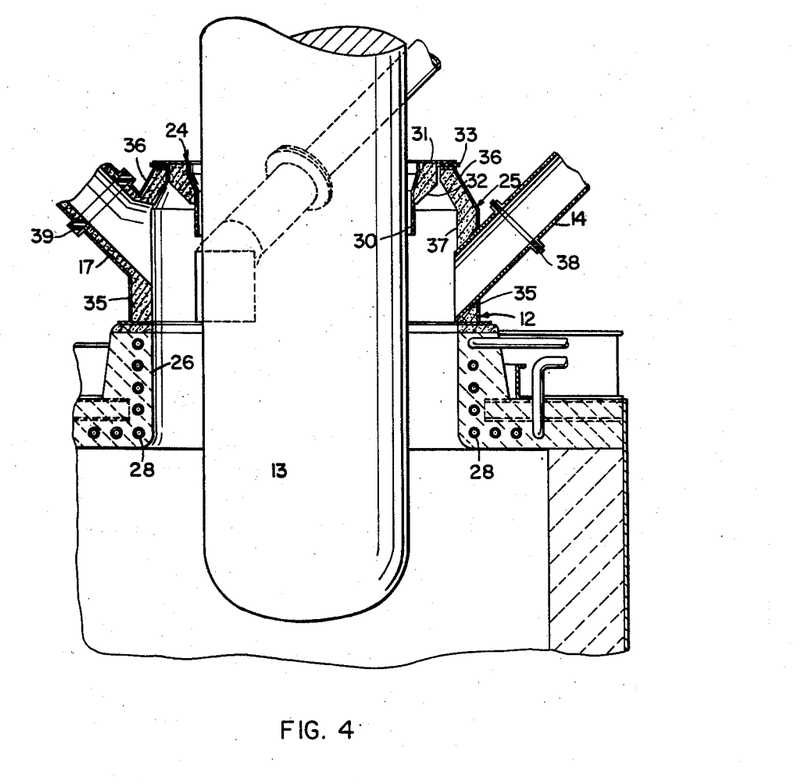
Fig. 4 is an enlarged cross-sectioned view showing the cover feed chamber in greater detail.

Other details of construction can be observed in Fig. 4, which shows an enlarged view of a dome 12. Electrode seal 24 which is concentric with the electrode 13 is comprised of inwardly-bent annular stainless steel ring 30 having an outwardly-extending horizontal top flange 31 and refractory heat insulation 32, which is attached to ring 30 and flange 31. Flange 31 rests on gasket 33 which is on the top edge of the upper part 25 of dome 12. Gasket 33, which is made of an electrical insulating material, prevents electricity from passing from electrode 13 through seal 24 to the upper dome part 25.

The upper part, or cap, 25 of dome 12 is comprised of a tubular bottom portion 35 and an inwardly-inclined top portion 36. Both portions 35 and 36 have interior heat insulation 37 and are made of non-magnetic steel. Feed chute 14 extends through the wall of the insulated bottom portion 35, as is clearly shown. The terminal section of chute 14 is separated from the next section thereof by annular insulating gasket 38 to provide electrical insulation. Gas offtake 17 is similarly insulated by gasket 39.

The heat exchange annulus formed by electrode 13 and dome 12 may vary from two to six feet in height and from one-half to three feet in width, depending on the values of the various design factors such as the electrode spacing, the power loss in the electrodes, and the heat exchange rate.

In operation, the stationary furnace is charged with raw material such as calcium oxide and coke in proper proportions through chutes 14. Proper distribution of material around the electrode 13 is made by having three equispaced chutes 14. However, other means such as one chute with baffles could be provided to accomplish the proper distribution. The illustrated gravity type feed is economical and dependable for proper feed distribution.

At the tips of the electrodes 13 intensely hot electric arcs are established and the raw materials, calcium oxide and coke, is converted into calcium carbide with the formation of carbon monoxide gas. Since the hot gases are confined within the furnace 10 by sealed cover 11, they are forced to pass upwardly through, and concurrently to, the raw material in the annular heat exchange chamber formed by electrode 13 and dome 12 to the gas offtakes 17. The gases, which are channeled upward around the electrode 13 by the confining action of the sintered crater shell around the electrode tip which is formed after the furnace has been in operation, flow directly into the heat exchange chamber. This is the path of least resistance for the channelized gases and these gases, which have a high velocity at the point of escape from the crater shell, are quickly dispersed and retarded by the charge of raw material in the path of the escaping gases. In this manner, all reaction gases are forced into intimate direct heat exchange relation with the particles of raw material in the dome and the period of time of heat exchange relation is prolonged by the distributing and damping effect of the raw material particles in the path of the escaping gases. The hot gases give up their sensible heat directly and uniformly to the particles. This effective preheating results in a power saving and in more uniform operation for the carbide furnace.

It is to be noted that the superimposing of the raw material on the layer of charge around the electrode gives an effective greater depth of charge which can be pre-heated without the possibility of lateral current leakage and its consequent influence on electrode elevation. By referring to Fig. 3 it can be seen that the maximum depth of the horizontally continuous upper strata of raw material in the furnace between electrodes is but a fraction of the total depth of raw material surrounding the electrode where effective preheating occurs.

Figure 5:
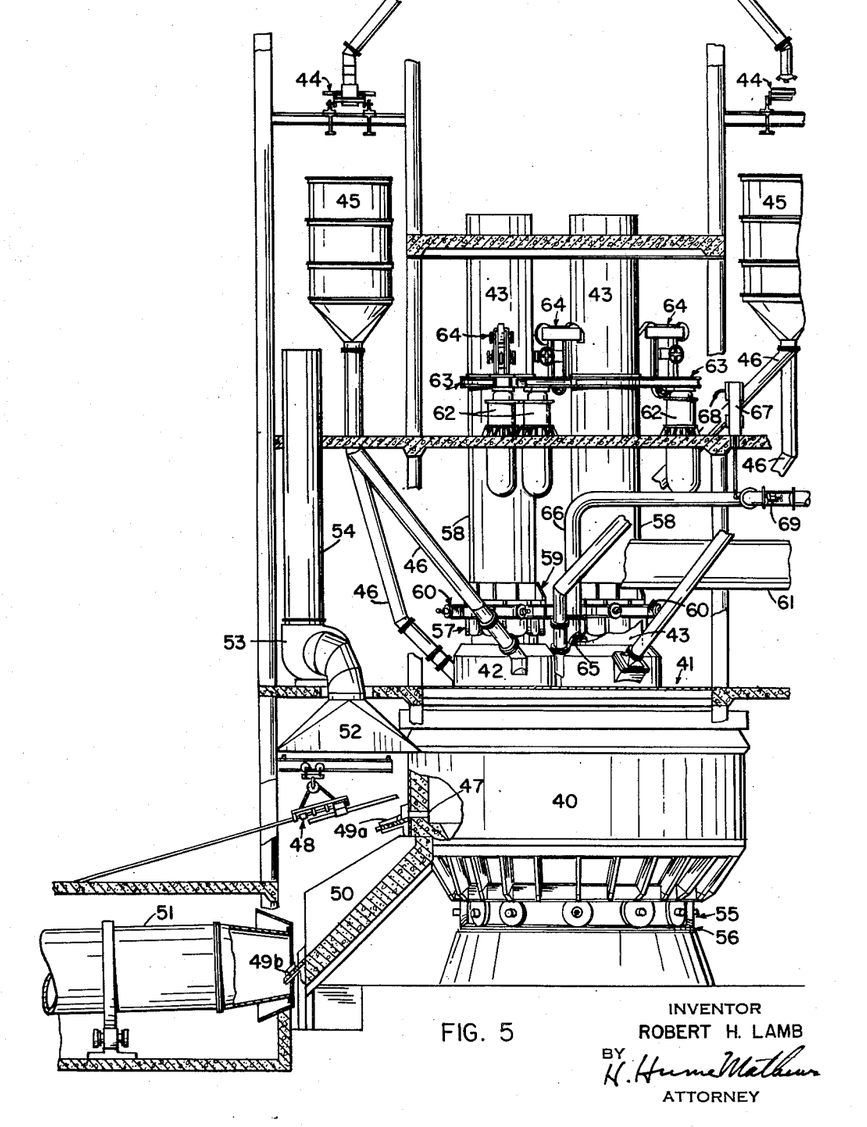
Fig. 5 is a side elevation with parts cross-sectioned of a calcium carbide plant which has a rotary, multi-electrode furnace; the foremost electrode of the three electrodes is omitted in part.

In Figs. 5 to 12, a complete calcium carbide plant which has a rotating furnace is shown. Referring to Fig. 5, the carbide plant comprises an open-top rotary furnace 40 which is closed and sealed by a stationary cover 41 having domes 42. Electrodes 43 extend through the cover domes 42 into the furnace 40. In the furnace 40, an electric arc is established in the space between the tips of electrodes 43 and a hearth electrode in the bottom of the funace 40. The intense arc heat causes raw materials to react to form the desired molten end product and in so doing evolve reaction gases.

From above the furnace, conveyor 44 carries raw material to hoppers 45 laterally spaced from the tops of electrodes 43. Chutes 46, connected to the bottom of the hoppers 45, guide raw material to the outer peripheries of domes 42 extending up from furnace cover 41. In the side wall of furnace 40, a tap hole 47 is provided and molten end products pass therethrough when the suspended, tapping plunger 48 is used to open tap hole 47. The molten end product flows down over tap lip 49a, stationary tapping trough 50, and trough lip 49b and then into a slightly inclined, horizontal rotary cooler 51 at the bottom of the trough 50. Above the trough 50 and adjacent the round side wall of the furnace 40 is a ventilation hood 52 which is connected by a duct to a fan 53 which discharges into flue 54.

The furnace 40 is rotatably supported by wheels 55 which travel over circular track 56. Means for rotating the furnace are beneath the furnace and will be described hereinafter.

The electrodes 43 which pass through the tops of the domes 42 of the furnace cover 41 into the furnace 40, are supplied with electrical current by means of contact shoes 57 above the domes 42. The shoes 57 are suspended from electrode mantles 58 by rods 59 and are urged into contact with the electrodes 43 by clamps 60. The electrical conduits leading to shoes 57 have been omitted from Fig. 5 except for a ventilated bus bar 61.

Hydraulic cylinder lifts 62 are located at about the vertical midpoint of electrodes 43. Hydraulic lifts 62 raise and lower electrodes 43 by elevating or lowering yokes 63 attached to electrode mantles 58. This motion varies the arc length between the electrodes 43 and hearth electrode and so regulates the arc current as previously described. Current is prevented from passing from electrodes 43 to lifts 62 by means of insulation between the bottom of yoke 63 and the top of lift 62.

The electrodes 43 can be the continuous self-baking type which is described in United States patent, No. 1,751,177, to Sem and Soderberg, and are suspended with safety means 64 which permit lowering of the electrodes as they are consumed. The safety means 64 is typically illustrated in United States patent, No. 1,972,849, to S. A. Wisdom.

Figure 7:
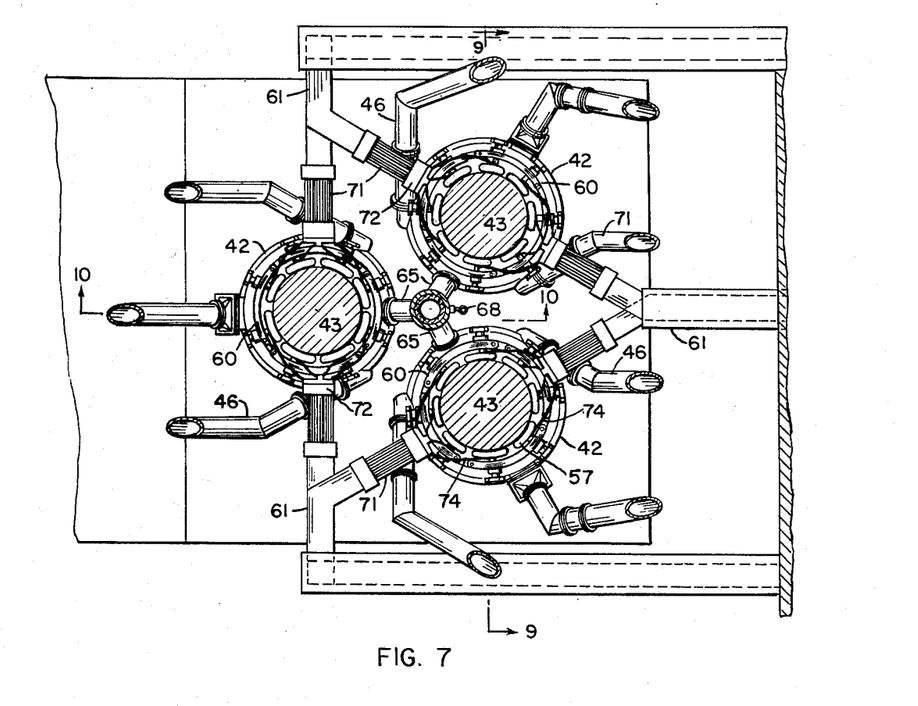
Fig. 7 is a top view on lines 7—7 of Fig. 6, but with electrical leads included in part, and shows the electrical connections to the electrodes.
Figure 8:
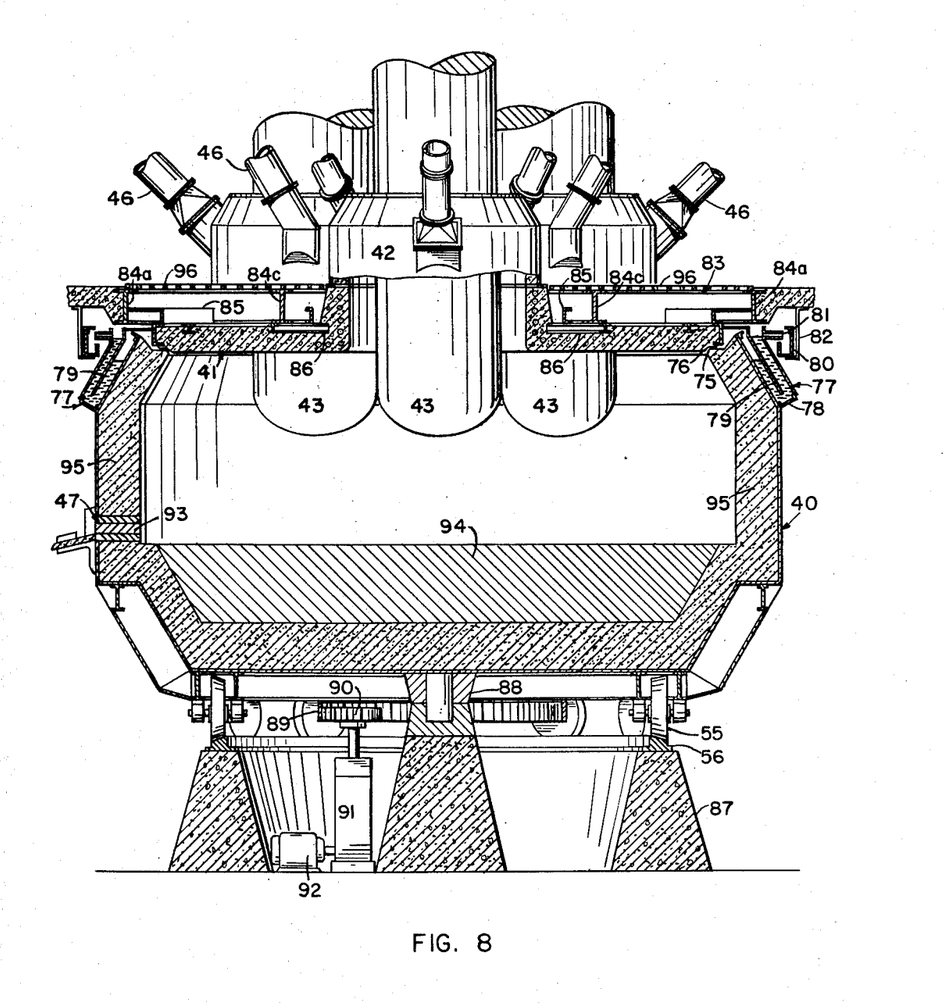
Fig. 8 is a side cross-sectioned view of the furnace and shows the furnace rotating means.
Figure 9:
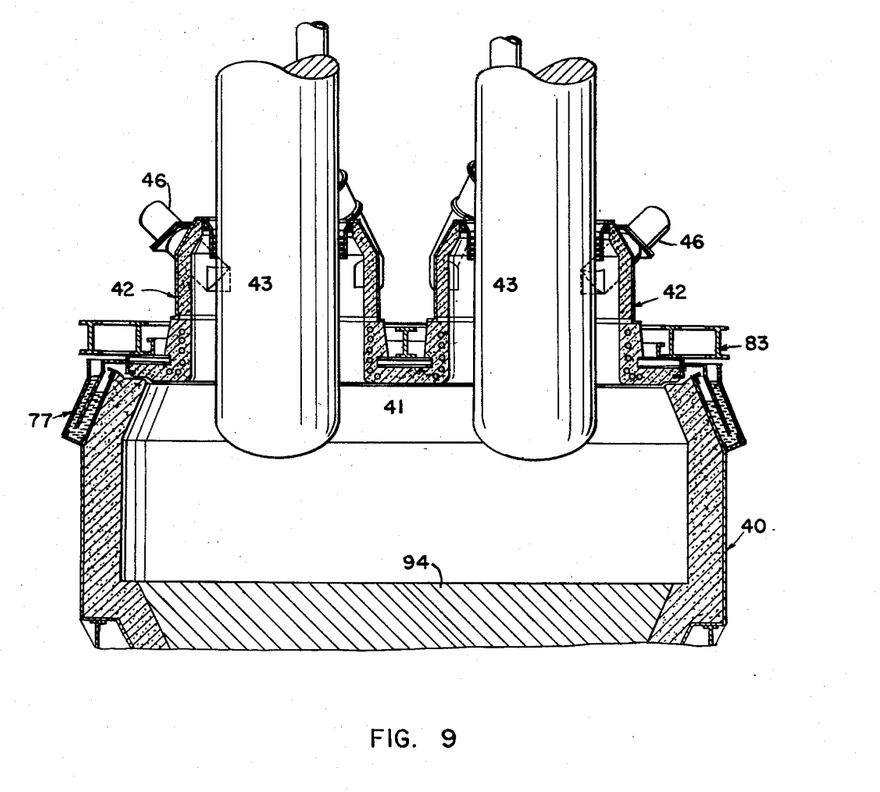
Fig. 9 is a side cross-sectioned view in which two of three equispaced electrodes appear as viewed along 9—9 of Fig. 7.

Cover 41 has a substantially flat portion and three upwardly-extending cover housings 42 (see Fig. 8). Three equispaced chutes 46 feed each housing. A reaction gas outlet 65 for each housing 42 joins a central header 66 (see Fig. 7). Pressure-responsive means 67 controls a damper (not shown) in header 66 to maintain a slight superatmospheric pressure in chutes 46 and housings 42 in order that air cannot enter the reaction zone of the furnace 40. From pressure-responsive means 67, a connecting conduit 68 extends to the juncture of the central header 66 and gas offtakes 65 (see Fig. 10), and so renders pressure-responsive means 67 responsive to the pressure in the header at this point upstream of the damper. This in turn causes means 67 to properly adjust the connected damper in the horizontal portion of header 66, which extends perpendicular to the plane of the Fig. 5 drawing.

Only a slight superatmospheric pressure (for instance, about .1 of an inch of water) is maintained. Little or no gases escape through the chutes 46, due to the flow impedance of the raw material. Maintenance of uniform pressure in the upper part of the furnace and domes is greatly facilitated by the compact arrangement between header 66, gas offtakes 65, and the housings 42. The pressure-responsive means 67 is well known per se, and has not been described or shown in detail for that reason. It is to be noted that the reaction gas manifold, or header, 66 is large enough to carry all of the gases from the housings 42 at a suitable velocity while the gas offtakes 66 from each housing 42 to the header exceed the size which would be necessary. In this manner, the velocity of the gases in gas outlets, or offtakes, 65 is less, and correlation of pressures between (1) the juncture of the offtakes 65 and the header 66 and (2) the cover domes 42 is facilitated. The pressure in the top of each dome approximates the pressure at the closely adjacent juncture point and variations of pressure among the upper spaces in the various domes are minimized. Exhaust fan 69, positioned in header 66 downstream of the damper, is also provided to aid in the removal of the reaction gases. With the arrangement described above, there is little or no tendency for gases to escape through the electrode seal since the gas pressure inside the seal adjacent thereto is regulated and maintained at a value which may be approximately the same as, or only slightly greater than, atmospheric pressure on the outside of the seal.

Other details of construction will now be described with reference to various drawings.

Figure 6:
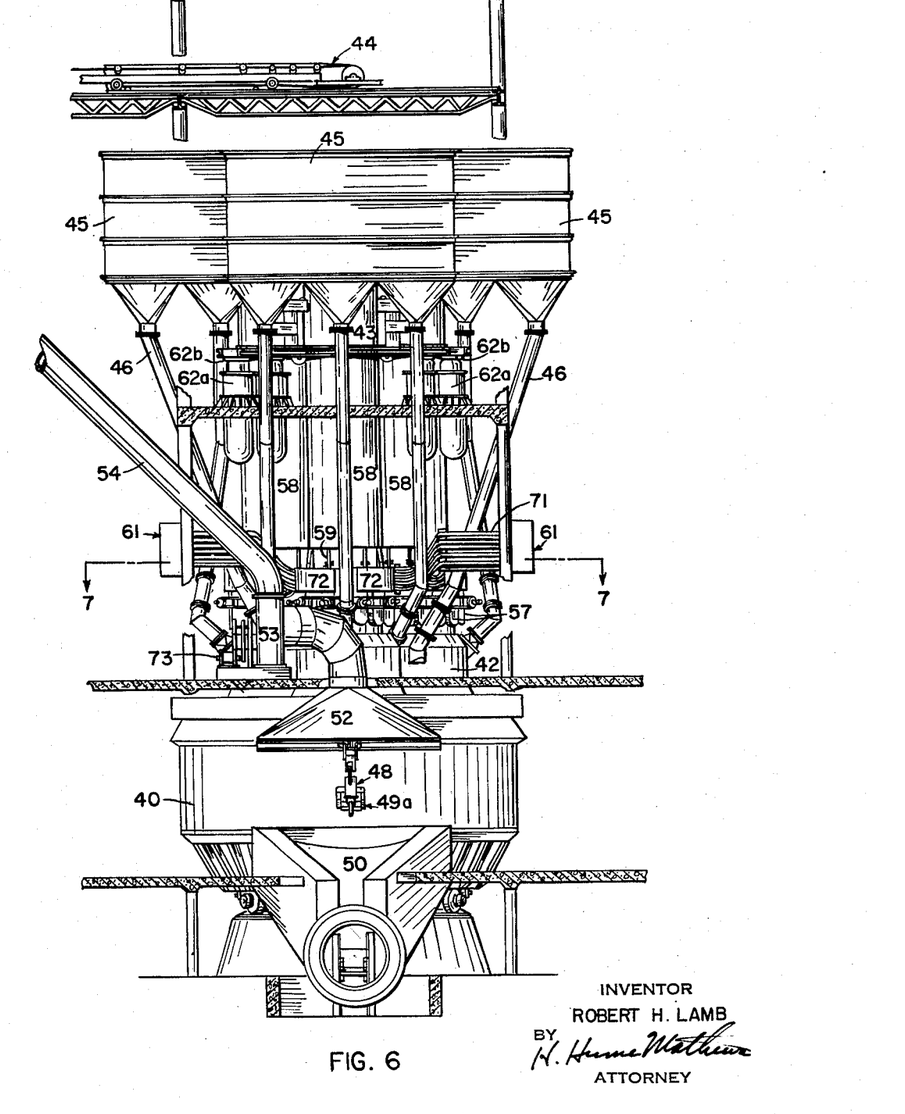
Fig. 6 is a front elevation of the carbide plant shown in Fig. 5.

Referring to Fig. 6, wherein all three electrodes are shown, it can be seen that electrical flexible conductors 71 extend from ventilated bus bars 61 to blocks 72, which are adjacent electrode shoes 57. Current passes from blocks 72 to electrode shoes 57 by suitable connections, as shown in Fig. 7. Ventilating fan 53 appears with its operatively-connected motor 73. Trough 50 is shown constructed so that tapping from the slowly rotating furnace 40 through tap hole 47 can be accomplished without stopping the furnace 40. The trough 50 is made so that it covers about 45 degrees of rotation of tap hole 47, and the tap hole is shown halfway through the arc which overlies the trough 50. The circumferential trough 50 conveniently provides means for tapping the furnace while the hearth is rotating.

In the top view shown in Fig. 7, the electrical connections to electrodes 43 are shown more clearly. Ventilated bus bars 61 connect to flexible electrical connectors 71. Connectors 71 terminate in blocks 72 and conductors 74 run inwardly from the blocks 72 to the electrode shoes 57.

In Fig. 8, the arrangement for preventing escape of reaction gases between the furnace 40 and its cover 41 is shown at the outer periphery of the cover and the top of side walls of the furnace 40. The inner edge 75 of the top of the rotating furnace wall is located as close as practical to the shoulder 76 of the peripheral groove in the outer bottom surface of the cover 41. The prevention of the escape of reaction gases from the carbide reaction at the tip of electrodes 43 is assured by the further provision of water seal 77.

The water seal 77 is comprised of an inclined annular gutter, or seal trough, 78 attached to the outer part of the inclined upper wall of the furnace 40 and a correspondingly inclined depending flange, or seal plate, 79 attached to the peripheral band of cover 41. The flange 79 extends into the gutter 78 which contains water. In operation, the small positive pressure maintained in the upper portion of the furnace 40 would cause a difference in water level between the water in the gutter 78 on the interior side and on the exterior side of the flange 79. In operation, water is continuously added to gutter 78 and an overflow is permitted into the annular overflow trough 80 from whence it is drained by conduits (not shown) through spouts 81 in the upper outer wall of gutter 78. The overflow trough 80 is positioned in underlying relation to the gutter spouts 81 by any suitable means such as supports 82.

The furnace cover 41, being made of a refractory concrete, is not self-suporting and a square structural framework 83 is provided. Framework 83 will be described more in detail hereinafter. Generally speaking, the framework 83 comprises heavy I-shaped beams 84a, 84c, and U-shaped channels 85. Small I-shaped beams 86 are embedded in the refractory concrete portion of the cover 41 and attached to the upper framework. The cover 41 is supported by columns located under the corners formed by outer "I" beams 84a of the square framework 83 (see Fig. 11).

Also in Fig. 8, the supporting means which rotatably support the furnace and the means for rotating the furnace are shown.

The furnace is supported by spaced beveled wheels 55 which depend from the bottom of the furnace 40 and run on a beveled circular track 56 mounted on support 87 beneath the furnace. The furnace is rotatably centered by means of center bearing 88. The furnace is rotated by means of an inwardly gear-toothed, annular flange 89 which is attached to the bottom of the furnace and the teeth of which register with a spur gear 90 driven by reducing means 91 from an electric motor 92.

Tap hole 47 is shown closed by plug 93. The carbon hearth electrode 94 is shown in the bottom of the furnace and rests on the furnace lining 95 which is made of firebrick. A wood grating 96 is provided over the furnace cover 41 for furnace operators, and it rests on the upper surfaces of the I-shaped beams of the cover framework 83.

Figure 10:
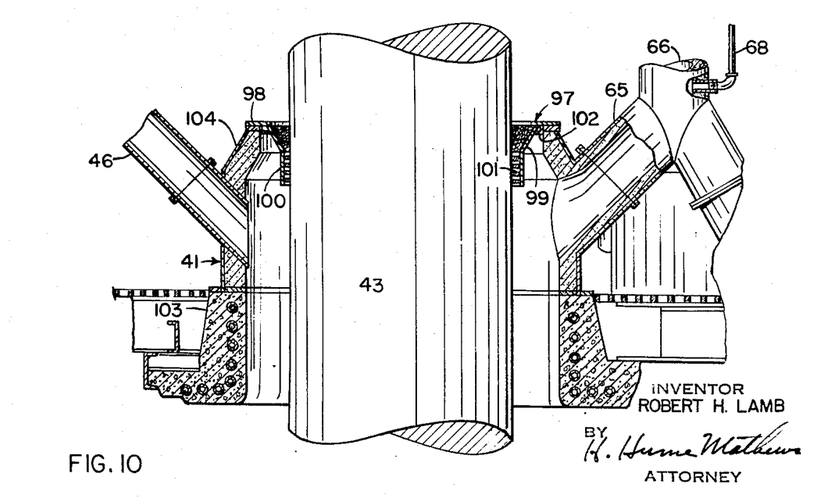
Fig. 10 is an enlarged cross-section of the cover housing, taken along line 10—10 of Fig. 7.

In the enlarged view of the cover housing 41, shown in Fig. 10, the electrode seal 97 at the top of the cover housing 41 is shown as comprised of an annular flange 98 which rests on the top of cover housing 41 and has a depending tubular portion having inwardly inclined upper section 99 and a straight section 100 parallel to the surface of the electrode 43. Short horizontal members 101 extend inwardly from the straight section 100 toward the electrode 43. Asbestos is packed between the electrode 43 and the inclined section 99. Water cooling of the seal 97 is provided in order that combustion of any reaction gases, which might escape through electrode seal 97, will not cause damage. The cooling is accomplished by running water into conduit 102 beneath annular flange 98. The inlet and outlet for the water to conduit 102 have not been shown. Metallic portions of the electrode seal 97 would preferably be made of stainless steel and can be welded together.

The housings, or domes, 41 are comprised of two main parts, the upwardly extending lower boss 103 and the superimposed top section 104. Boss 103 is integral with the flat main portion of the refractory concrete cover 41. The top sections 104 are comprised of a non-magnetic steel outer shell and are interiorly insulated against heat transmission. The metallic shell of top section 104 facilitates the welding or attachment thereto of chutes 46 and gas offtakes 65. The juncture of the gas offtake conduit sections and the feed chute sections adjacent the housing 41 would be electrically insulated, although this has not been shown on the drawing.

Figure 11:
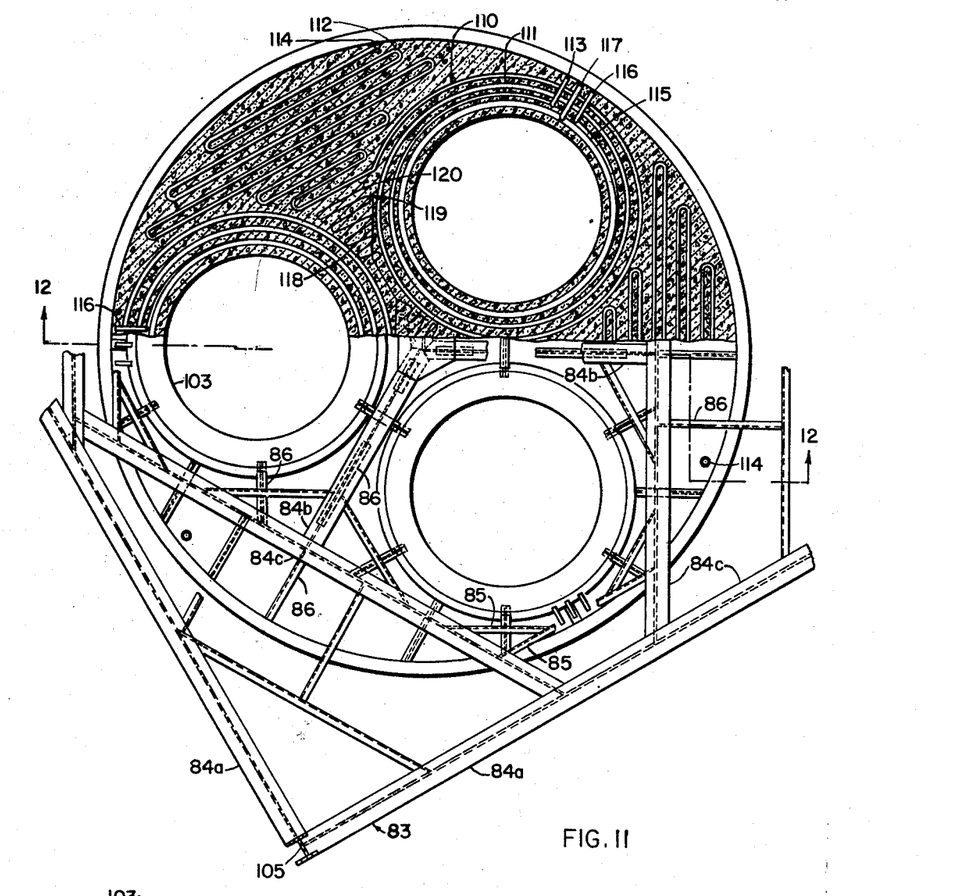
Fig. 11 is a top view of the cover with half in cross-section, and parts of the cover-supporting framework are shown.
Figure 12:
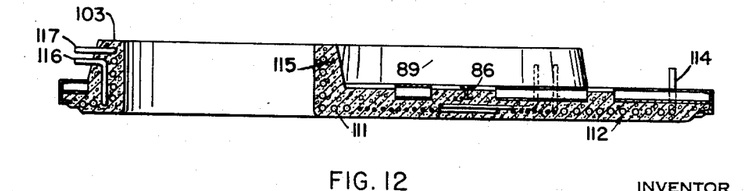
Fig. 12 is a side view of the cover taken on line 12—12 of Fig. 11, but with the cover-supporting framework omitted.

The structural support for the Figs. 5–12 cover can best be described by reference to Fig. 11. The entire stationary cover 41 is supported above the rotating furnace by columns 105 beneath the corners of the square steel framework 83. The outer I-shaped beams 84a form the square. Beams 84b radiate from the center of the circular cover 41 and join tangent beams 84c. Small, short I-shaped members 86 are embedded in the flat portion of the refractory concrete cover 41. Small members 86 are connected to the large I-beams 84b, 84c or to the supplemental U-shaped members 85 of the framework 83.

In practical operations, it is necessary to cool the refractory concrete cover in order that the cover can withstand the occasional severe thermal conditions in the furnace, and to prolong the useful life of the cover. Again referring to Fig. 11, it can be seen that a large cooling coil 110 has loops 111 which are in the flat cover portion and are concentric with the boss 103 and terminates in loops 112 which cool the cover portions remote from the housings 41. Coil 110 has water inlet 113 adjacent boss 103, and water outlet 114 near the cover periphery and spaced from the housing 41. Another large cooling circuit 115 is embedded in the lower part, or boss, 103 of the housing 41 and has loops circling upwardly in the lower part of the housing (see Fig. 12). Circuit 115 has inlet 116 adjacent the base of the lower part 103 and outlet 117 near the top of lower part 103. Three smaller cooling circuits 118 are embedded in the portion of the cover which is in the tangential areas between electrodes. Circuits 118 have water inlets 119 and outlets 120.

In operation of the rotary furnace cover, the raw material in the furnace is reacted by the arc adjacent the tip of the stationary electrodes 43 while the furnace is slowly rotated. Gases generated in the reaction zone rise up laterally through the raw material and also upwardly around the electrode and then countercurrently through the properly distributed raw material in the annular heat exchange chamber which is formed by the electrode 43 and the inner walls of the dome 42. In this chamber, intimate direct gas-to-particle heat transfer will occur. The gases directly give up their sensible heat to the incoming raw material and the raw material is effectively preheated. Also, the previously described dispersal of gases, and lowering of their velocity by the raw material which is in the path of least resistance for the gases occurs and results in longer and more uniform heat exchange between the gases and raw materials.

Although preferred forms of the invention have been specifically illustrated and described, it will be apparent to one skilled in the art that various changes and modifications might be made without departing from the spirit of the invention as defined in the following claims.

I claim:
1. In a calcium carbide furnace, a hearth portion, a roof portion closing the top of said hearth portion to form a sealed reaction chamber in said hearth portion, a plurality of electrodes extending through said roof portion into said reaction chamber, a tubular housing around each of said electrodes forming therewith an annular passage having an open inner end communicating with said reaction chamber and an outer end closed by a seal between the housing and the electrode passing therethrough, feed conduits connected with the upper ends of said housings for passing raw materials through said annular passages into said reaction chamber, and an exhaust conduit connected to the upper end of each of said housings for removing gaseous products of reaction from said reaction chamber by way of said annular passages, countercurrently with respect to the flow of said raw materials and in direct heat exchange relationship therewith.

2. A furnace according to claim 1, in which means are provided for maintaining the pressure of the gaseous products of reaction on the inside of said electrode-housing seals at a predetermined value which is approximately the same as the atmospheric pressure on the outside of said electrode-housing seals.

3. An electric furnace having a cover for confining reaction gases within said furnace, said cover having three equispaced heat exchange domes, electrode openings in the top of said domes, electrodes extending through said openings, and forming with each of said domes a continuous annular space which is open at its lower end to the furnace, gas sealing means at the upper end of each annular space between said electrodes and said openings, said domes having both raw material inlets and reaction gas outlets at the upper ends of said annular spaces, whereby when said furnace is in operation reaction gases will be confined by said cover and will be forced through the annular spaces formed by said electrodes and domes in order to provide direct heat exchange between escaping reaction gases and incoming raw materials.

4. A rotary electric arc furnace having an open top, said furnace being rotatably mounted, means operably connected to said furnace and capable of rotating said furnace, a stationary cover positioned over the top of said furnace, gas-tight sealing means between the edges of said top and said cover, domes extending up from said cover, said domes having electrode openings in the uppermost portions thereof, electrodes extending downwardly through said openings into said furnace and forming with said domes heat exchange chambers, means adjacent said electrode openings for introducing raw material into said chambers uniformly around the top portion thereof, a gas outlet adjacent each of said electrode openings, and a gas exhausting system connected to said gas outlets, whereby, when said furnace is in operation, reaction gases flow countercurrently to raw material in said chambers and effectively preheat the raw material.

5. An electric arc furnace roof comprising a base portion having sealing means around its peripheral edge for engaging a furnace wall, housings extending up from said base portion, raw material inlets adjacent the tops of said housings, gas outlets adjacent the tops of said housings and means in said housings for receiving, vertically and centrally, an electrode.

6. A cover for an electric arc furnace which comprises a substantially flat, water-cooled main portion made of a refractory material, three equally spaced heat exchange domes extending upwardly from said main portion, each dome having a top electrode-receiving opening and being arranged to form with an electrode extending vertically through said opening a continuous annular preheating chamber of from two to six feet in height and from one-half to three feet in thickness, feed chutes connected with the tops of said domes, and gas outlet pipes connected to said domes adjacent said chutes.

7. A rotating furnace which is closed with a stationary cover having three closely-spaced domes arranged in equilateral pattern, said domes each having a top electrode-receiving opening and adjacent thereto separate outlet means for furnace off gases and separate inlet means for furnace charge material, electrodes extending into said furnace through said electrode openings, and sealing means between each electrode and the respective dome for preventing escape of gases through the electrode openings.

8. An electric arc furnace cover comprising a substantially horizontal refractory main portion having upstanding hollow bosses integral therewith, metallic interiorly heat-insulated hollow caps joined to the top of said bosses, said caps having top electrode openings and gas outlet conduits adjacent to said electrode openings, each of said caps having equally spaced openings in the side wall thereof for receiving furnace charge material.

9. A refractory concrete electric arc furnace cover which has three equilaterally spaced electrode-receiving upwardly-extending bosses, cooling coils embedded in said cover in the triangular area defined by said bosses, and cooling conduits embedded in said bosses and in the cover below said bosses.

10. An electric arc furnace having a cover; said cover having three domes which extend upwardly, said domes being an equal distance from the center of said cover, gas conduits extending from said domes towards the center of said cover, a gas header having a portion positioned above the center of said cover and joined to said gas conduits, means in said header for regulating the gas flow therein, and pressure-responsive means operably associated with said means for regulating gas flow for controlling said gas flow regulating means to maintain the pressure in said gas conduits substantially constant, said pressure-responsive means being connected to said gas header adjacent the point where said gas conduits join said header.

ROBERT H. LAMB.

References Cited in the file of this patent
UNITED STATES PATENTS

| Number | Name | Date |
| --- | --- | --- |
| 842,099 | Landis | Jan. 22, 1907 |
| 1,751,177 | Sem et al. | Mar. 18, 1930 |
| 1,806,210 | Miguet | May 19, 1931 |
| 1,922,312 | Mansfield | Aug. 15, 1933 |
| 1,944,521 | Miguet et al. | Jan. 23, 1934 |
| 1,972,849 | Wisdom | Sept. 4, 1934 |
| 2,300,355 | Ellefsen | Oct. 27, 1942 |
| 2,334,275 | Michelat | Nov. 16, 1943 |
| 2,426,643 | Ridgway | Sept. 2, 1947 |
| 2,447,809 | Miguet et al. | Aug. 24, 1948 |